UNITED STATES PATENT OFFICE.

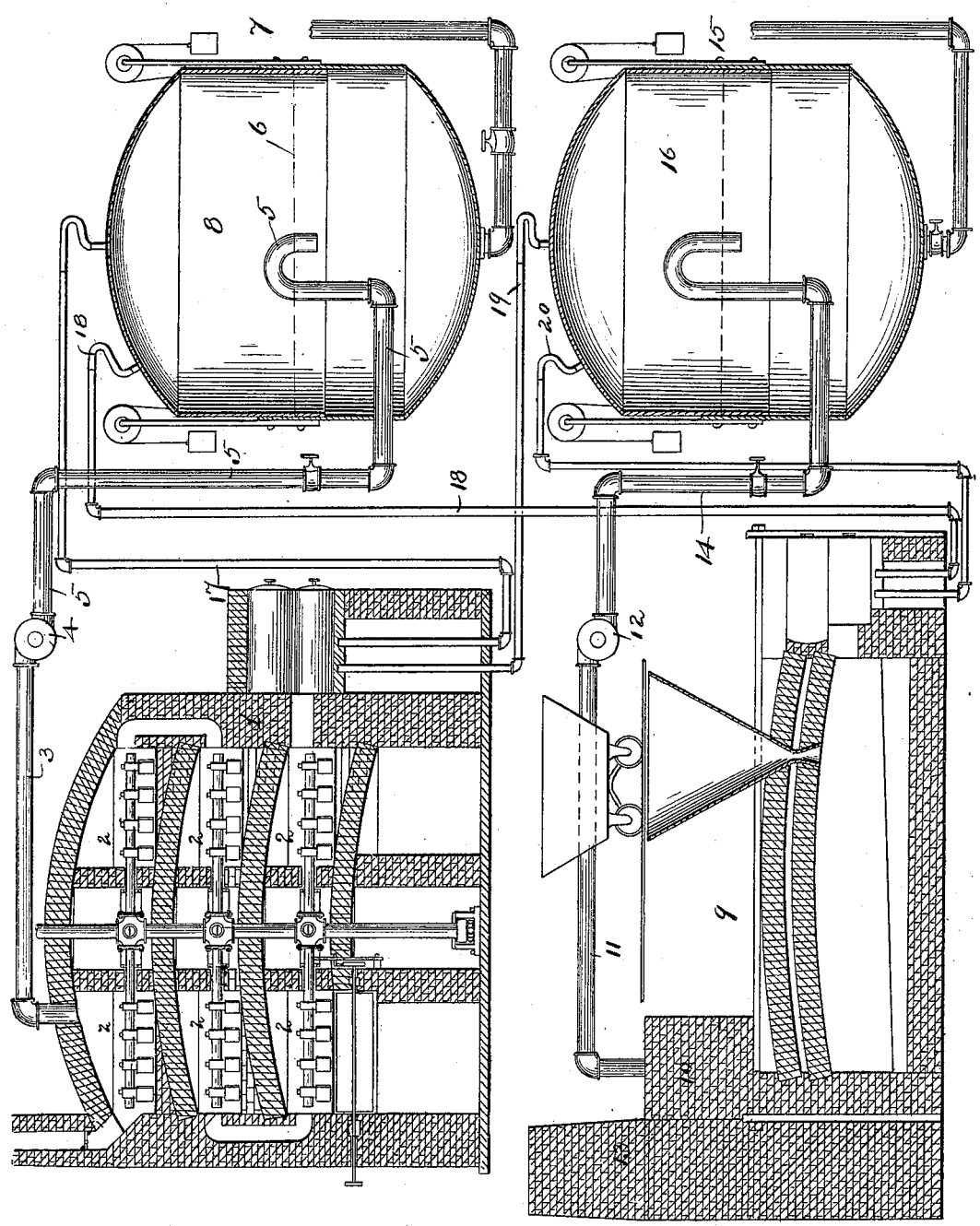

HARRISON B. MEECH, OF DENVER, COLORADO.

APPARATUS FOR UTILIZING WASTE GASES AND FUMES FROM FURNACES.

SPECIFICATION forming part of Letters Patent No. 641,461, dated January 16, 1900.

Application filed March 4, 1899. Serial No. 707,800. (No model.)

*To all whom it may concern:*

Be it known that I, HARRISON B. MEECH, a citizen of the United States, residing at Denver, in the county of Arapahoe and State of Colorado, have invented new and useful Improvements in Apparatus for Utilizing the Waste Gases and Fumes from Furnaces, of which the following is a specification.

In the ordinary processes of roasting and smelting gold, silver, copper, and iron ores the gases and fumes which arise from said ores are allowed to pass up the chimney and are wasted.

The object of my invention is to save and utilize the aforesaid gases and fumes.

My invention consists in the combination of roasting and smelting furnaces with gasometers, as hereinafter set forth in the specification, and particularly pointed out in the claim thereof.

In the drawing, I have illustrated a sectional elevation of a roasting-furnace and of a smelting-furnace, each connected by a system of piping with two gasometers.

In the drawing like numerals refer to like parts.

Referring to the drawing, 1 is a cylindrical muffle-furnace for roasting ores, similar in construction to the furnace forming the subject-matter of an application for Letters Patent, Serial No. 707,799, prepared and executed by me and filed in the Patent Office on even date herewith, with the exception that the gas and fumes from the ores in said furnace after passing through the ovens 2 2 passed out from the upper oven through a chimney to the open air. In my present construction the said gas and the fumes from the ores are drawn out of the upper oven 2 through a pipe 3 by a suction fan-pump 4, and thence are forced through a pipe 5 into the water 6 in a gasometer 7. The fumes are precipitated in the water and settle to the bottom of the gasometer, while the gases rise to the top and collect in the chamber 8.

9 represents a sectional elevation of a smelting-furnace. The highly-heated gas and fumes are drawn from the chamber 10 through a pipe 11 by a suction-fan 12 before entering the stack 13, and thence are forced through a pipe 14 into a gasometer 15, where the fumes are precipitated and settle in the water and the gas rises to the top and collects in the gas-chamber 16. The gas in the gasometer 8 is conveyed by a pipe 17 to the roasting-furnace 1 and by the pipe 18 to the smelter 9. The gas from the gasometer 15 is conveyed by the pipes 19 and 20 to the roaster 1 and smelter 9, respectively. The gases are then burned, forming a very hot flame, and are used for roasting and smelting the ores in the respective furnaces, thus saving all waste of gas.

The solid material derived from the aforesaid precipitation of the fumes is drawn off at intervals from the bottom of the gasometers into vats, the water is then drained off, and the solid material thus obtained is baked in the form of bricks and the metal extracted therefrom in the ordinary manner of treating ores.

I do not intend to limit myself to any particular form of roaster or smelter, as it is evident that any practical form of either may be used to advantage without departing from the spirit of my invention.

Having thus described my invention, what I claim, and desire to secure by Letters Patent, is—

In an apparatus for utilizing gases and fumes from ores, a roasting-furnace in combination with a gasometer, means for forcing the gases and fumes from said furnace into said gasometer, a smelting-furnace in combination with a gasometer, means for forcing the gases and fumes from said furnace into said gasometer, and return-pipes leading from each of said gasometers to each of said furnaces, substantially as described for the purpose specified.

In testimony whereof I have hereunto set my hand in presence of two subscribing witnesses.

HARRISON B. MEECH.

Witnesses:
CHARLES S. GOODING,
ARTHUR A. COBURN.